(12) United States Patent
Brown

(10) Patent No.: US 8,074,809 B2
(45) Date of Patent: Dec. 13, 2011

(54) APPARATUS AND METHOD FOR THE TREATMENT OF LIQUID/SOLID MIXTURES

(75) Inventor: Claude Edward Brown, Lodi, CA (US)

(73) Assignee: Gordon H. King, Stockton, CA (US)

( * ) Notice: Subject to any disclaimer, the term of this patent is extended or adjusted under 35 U.S.C. 154(b) by 0 days.

(21) Appl. No.: 12/838,302

(22) Filed: Jul. 16, 2010

(65) Prior Publication Data

US 2011/0011811 A1    Jan. 20, 2011

Related U.S. Application Data

(60) Provisional application No. 61/226,592, filed on Jul. 17, 2009.

(51) Int. Cl.
| | |
|---|---|
| B01D 29/11 | (2006.01) |
| B01D 29/70 | (2006.01) |
| B01D 29/72 | (2006.01) |
| B01D 29/82 | (2006.01) |
| B01D 33/64 | (2006.01) |

(52) U.S. Cl. ........ 210/350; 210/351; 210/386; 210/388; 210/416.1; 210/418; 210/241; 210/389; 210/770; 100/111; 100/121; 100/126; 100/131; 100/155 R; 417/476; 417/477.1; 417/477.6; 417/477.8

(58) Field of Classification Search .................. None
See application file for complete search history.

(56) References Cited

U.S. PATENT DOCUMENTS

| | | | | |
|---|---|---|---|---|
| 249,285 A | * | 11/1881 | Allen | 417/477.14 |
| 258,349 A | * | 5/1882 | Bard | 100/151 |
| 271,387 A | * | 1/1883 | Wilcox | 100/96 |
| 328,472 A | * | 10/1885 | Faller | 417/477.11 |
| 358,989 A | * | 3/1887 | Sanor | 100/97 |
| 457,217 A | * | 8/1891 | Rohrer | 100/152 |
| 459,053 A | * | 9/1891 | Truax | 417/477.8 |
| 487,136 A | * | 11/1892 | Truax | 417/477.8 |
| 502,523 A | * | 8/1893 | Lockstaedt | 100/151 |
| 1,350,788 A | * | 8/1920 | Day | 100/120 |
| 1,546,360 A | * | 7/1925 | Bates | 53/451 |
| 1,741,070 A | * | 12/1929 | Cornet y Oliveras | 417/477.8 |
| 1,848,024 A | * | 3/1932 | Owen | 417/477.8 |
| 1,988,337 A | * | 1/1935 | Santiago et al. | 417/477.11 |
| 2,102,523 A | * | 12/1937 | Ferrara et al. | 417/326 |
| 2,313,702 A | * | 3/1943 | Allen | 29/17.1 |
| 2,434,802 A | * | 1/1948 | Jacobs | 417/412 |
| 2,466,618 A | * | 4/1949 | Stocks | 417/477.11 |
| 2,703,256 A | * | 3/1955 | Mascaro | 222/613 |
| 2,881,127 A | * | 4/1959 | Hetzel | 208/26 |

(Continued)

FOREIGN PATENT DOCUMENTS

DE     102005046298 A1 *  4/2007

(Continued)

*Primary Examiner* — Robert James Popovics

(74) *Attorney, Agent, or Firm* — Steven R. Vosen

(57) ABSTRACT

An apparatus and method are disclosed for the continuous treatment of the flow of a mixture containing liquids and solids. A pump provides the mixture to tube that includes a woven material. The liquid is filtered from the mixture, leaving a solids-enriched mixture in the tube. The tube may be flexed during the process, freeing solids trapped in the tube to flow through the center of the tube. A valve may be provided to the tube to generate a back-pressure in the system.

7 Claims, 13 Drawing Sheets

U.S. PATENT DOCUMENTS

| | | | | |
|---|---|---|---|---|
| 3,180,825 | A | * | 4/1965 | Baldwin et al. ............... 210/678 |
| 3,190,321 | A | * | 6/1965 | Robinson .......................... 141/1 |
| 3,338,383 | A | * | 8/1967 | Hashimoto ................... 198/819 |
| 3,399,778 | A | | 9/1968 | O'Neill |
| 3,466,841 | A | * | 9/1969 | Rausing ......................... 53/426 |
| 3,523,077 | A | | 8/1970 | Camirad et al. |
| 3,530,791 | A | * | 9/1970 | Flotte ............................. 100/120 |
| 3,542,491 | A | * | 11/1970 | Newman ...................... 417/295 |
| 3,547,272 | A | * | 12/1970 | Kalish et al. ............. 210/321.87 |
| 3,610,500 | A | * | 10/1971 | Brown ........................... 226/172 |
| 3,612,278 | A | * | 10/1971 | Dieterich ...................... 210/177 |
| 3,625,141 | A | * | 12/1971 | Braun ........................... 100/119 |
| 3,650,298 | A | * | 3/1972 | Delmar ......................... 138/103 |
| 3,695,964 | A | * | 10/1972 | Shaines et al. ................ 156/161 |
| 3,712,762 | A | * | 1/1973 | Kenney ..................... 417/477.14 |
| 3,730,650 | A | * | 5/1973 | Kling ............................ 417/475 |
| 3,747,766 | A | * | 7/1973 | Brooks ......................... 210/259 |
| 3,758,239 | A | * | 9/1973 | Hrdina ..................... 417/477.11 |
| 3,763,621 | A | * | 10/1973 | Klein et al. .................... 53/439 |
| 3,768,934 | A | * | 10/1973 | Magerle ..................... 417/477.3 |
| 3,782,272 | A | * | 1/1974 | Cooper ....................... 99/450.7 |
| 3,787,148 | A | * | 1/1974 | Kopf ......................... 417/477.8 |
| 3,805,692 | A | * | 4/1974 | Fischer ........................ 100/120 |
| 3,876,340 | A | * | 4/1975 | Thomas ........................ 417/475 |
| 3,877,364 | A | * | 4/1975 | Jacquelin ........................ 100/37 |
| 3,877,609 | A | * | 4/1975 | Cullis ............................ 222/1 |
| 3,918,854 | A | * | 11/1975 | Catarious et al. ......... 417/477.11 |
| 3,927,955 | A | * | 12/1975 | Spinosa et al. ............. 417/477.3 |
| 3,963,023 | A | * | 6/1976 | Hankinson ...................... 604/19 |
| 3,997,446 | A | | 12/1976 | Nagakura |
| 4,012,176 | A | * | 3/1977 | Drori ............................ 417/405 |
| 4,017,398 | A | | 4/1977 | Hartmann et al. |
| 4,039,450 | A | * | 8/1977 | Brown ........................... 210/783 |
| 4,083,778 | A | * | 4/1978 | McGrew ....................... 210/671 |
| 4,111,801 | A | * | 9/1978 | Jay et al. ...................... 210/671 |
| 4,115,275 | A | * | 9/1978 | Morris ........................... 210/386 |
| 4,131,399 | A | * | 12/1978 | Calvet ...................... 417/477.12 |
| 4,131,546 | A | * | 12/1978 | Olsson et al. .................. 210/771 |
| 4,138,205 | A | * | 2/1979 | Wallach ......................... 417/360 |
| 4,152,268 | A | | 5/1979 | Krause |
| 4,157,065 | A | * | 6/1979 | Schinko .......................... 100/45 |
| 4,165,954 | A | * | 8/1979 | Amos ...................... 417/477.11 |
| 4,174,193 | A | * | 11/1979 | Sakakibara ................ 417/477.8 |
| 4,217,062 | A | * | 8/1980 | Trp et al. ........................ 401/44 |
| 4,229,299 | A | * | 10/1980 | Savitz et al. .................... 210/85 |
| 4,260,496 | A | | 4/1981 | Beer |
| 4,291,619 | A | | 9/1981 | Hunt et al. |
| 4,347,134 | A | | 8/1982 | Svehaug |
| 4,348,290 | A | | 9/1982 | Schipper |
| 4,363,609 | A | * | 12/1982 | Cosentino et al. ......... 417/477.5 |
| 4,501,669 | A | * | 2/1985 | Hakansson et al. ........... 210/770 |
| 4,518,507 | A | * | 5/1985 | Conner ......................... 588/252 |
| 4,520,724 | A | | 6/1985 | Costarelli |
| 4,540,350 | A | * | 9/1985 | Streicher ....................... 417/475 |
| 4,545,745 | A | * | 10/1985 | Barreca ...................... 417/477.3 |
| 4,549,860 | A | * | 10/1985 | Yakich ......................... 417/475 |
| 4,576,556 | A | * | 3/1986 | Thompson ............... 417/477.12 |
| 4,588,318 | A | * | 5/1986 | O'Brien et al. ................ 401/146 |
| 4,639,156 | A | * | 1/1987 | Stern et al. ..................... 401/146 |
| 4,681,688 | A | | 7/1987 | Sondov et al. |
| 4,702,679 | A | * | 10/1987 | Malbec ......................... 417/475 |
| 4,715,435 | A | * | 12/1987 | Foret ............................ 165/120 |
| 4,735,553 | A | * | 4/1988 | Vidal .............................. 417/33 |
| 4,770,793 | A | * | 9/1988 | Treffry-Goatley et al. ... 210/769 |
| 4,842,432 | A | * | 6/1989 | Snetting ....................... 401/197 |
| 4,869,049 | A | * | 9/1989 | Richards et al. ................ 53/459 |
| 4,878,622 | A | * | 11/1989 | Jamison et al. ............ 239/690.1 |
| 4,884,387 | A | * | 12/1989 | James ............................. 53/451 |
| 4,950,136 | A | * | 8/1990 | Haas et al. .................. 417/477.7 |
| 4,976,590 | A | * | 12/1990 | Baldwin ......................... 417/53 |
| 4,976,593 | A | * | 12/1990 | Miyamoto ................... 417/476 |
| 4,997,578 | A | | 3/1991 | Berggren |
| 5,009,795 | A | | 4/1991 | Eichler |
| 5,022,989 | A | * | 6/1991 | Put ............................... 210/386 |
| 5,158,672 | A | * | 10/1992 | Lagreca ......................... 210/86 |
| 5,220,717 | A | * | 6/1993 | Matsuoka et al. .............. 29/422 |
| 5,309,820 | A | * | 5/1994 | Baxter et al. .................... 99/280 |
| 5,340,290 | A | * | 8/1994 | Clemens ................... 417/477.1 |
| 5,350,526 | A | | 9/1994 | Sharkey et al. |
| 5,370,510 | A | * | 12/1994 | Sinclair et al. ............. 417/477.9 |
| 5,380,172 | A | * | 1/1995 | Ulbing ......................... 417/476 |
| 5,387,088 | A | * | 2/1995 | Knapp et al. .................... 417/53 |
| 5,433,851 | A | * | 7/1995 | Itoh .............................. 210/386 |
| 5,439,598 | A | | 8/1995 | Clough |
| 5,462,417 | A | * | 10/1995 | Chapman ................... 417/477.7 |
| 5,514,282 | A | | 5/1996 | Hibbard et al. |
| 5,520,824 | A | * | 5/1996 | Sasaki .......................... 210/780 |
| 5,614,092 | A | | 3/1997 | Di Leo |
| RE35,559 | E | * | 7/1997 | Lagreca ....................... 210/232 |
| 5,657,000 | A | * | 8/1997 | Ellingboe ..................... 340/608 |
| 5,661,405 | A | * | 8/1997 | Simon et al. .................. 324/697 |
| 5,725,783 | A | | 3/1998 | Hodén |
| 5,833,851 | A | | 11/1998 | Adams et al. |
| 5,925,258 | A | | 7/1999 | Pryor et al. |
| 6,135,293 | A | * | 10/2000 | Herbst et al. .................. 210/351 |
| 6,146,540 | A | * | 11/2000 | Nakamura et al. ............ 210/745 |
| 6,171,082 | B1 | * | 1/2001 | Hankner et al. ......... 417/477.12 |
| 6,190,569 | B1 | | 2/2001 | Parker |
| 6,190,570 | B1 | * | 2/2001 | Nakamura et al. ........... 210/776 |
| 6,221,265 | B1 | * | 4/2001 | Hoden ......................... 210/770 |
| 6,555,013 | B2 | * | 4/2003 | Nakamura et al. ........... 210/769 |
| 7,005,068 | B2 | | 2/2006 | Hoffland |
| 7,066,336 | B2 | * | 6/2006 | Keeping et al. .............. 210/359 |
| 7,128,242 | B2 | * | 10/2006 | Erlandsen ...................... 222/95 |
| 7,191,957 | B2 | * | 3/2007 | Anderson ...................... 239/99 |
| 7,314,141 | B1 | * | 1/2008 | Day .............................. 210/400 |
| 7,368,289 | B2 | * | 5/2008 | Baldwin et al. ................ 436/81 |
| 7,434,375 | B2 | * | 10/2008 | Pickett et al. .................. 53/450 |
| 7,888,126 | B2 | * | 2/2011 | Baldwin et al. ................ 436/81 |
| 2001/0054592 | A1 | * | 12/2001 | Day .............................. 210/783 |
| 2004/0022656 | A1 | * | 2/2004 | Anderson .................. 417/477.1 |
| 2004/0050777 | A1 | | 3/2004 | Khan |
| 2009/0053084 | A1 | * | 2/2009 | Klein ......................... 417/477.1 |
| 2009/0090432 | A1 | * | 4/2009 | Wells et al. ................... 141/129 |
| 2010/0080720 | A1 | * | 4/2010 | Miyazaki et al. .......... 417/477.6 |
| 2010/0150759 | A1 | * | 6/2010 | Mazur et al. ............. 417/477.13 |
| 2010/0200520 | A1 | * | 8/2010 | Hoden .......................... 210/770 |
| 2011/0009796 | A1 | * | 1/2011 | Tullis et al. .................. 604/5.02 |
| 2011/0011811 | A1 | * | 1/2011 | Brown ......................... 210/785 |
| 2011/0032287 | A1 | * | 2/2011 | Fioravanti et al. ............... 347/1 |
| 2011/0032288 | A1 | * | 2/2011 | Fioravanti et al. ............... 347/1 |
| 2011/0032306 | A1 | * | 2/2011 | Fioravanti et al. ............. 347/33 |

FOREIGN PATENT DOCUMENTS

| | | | |
|---|---|---|---|
| JP | 60235617 | A * | 11/1985 |
| JP | 2000000408 | A * | 1/2000 |

* cited by examiner

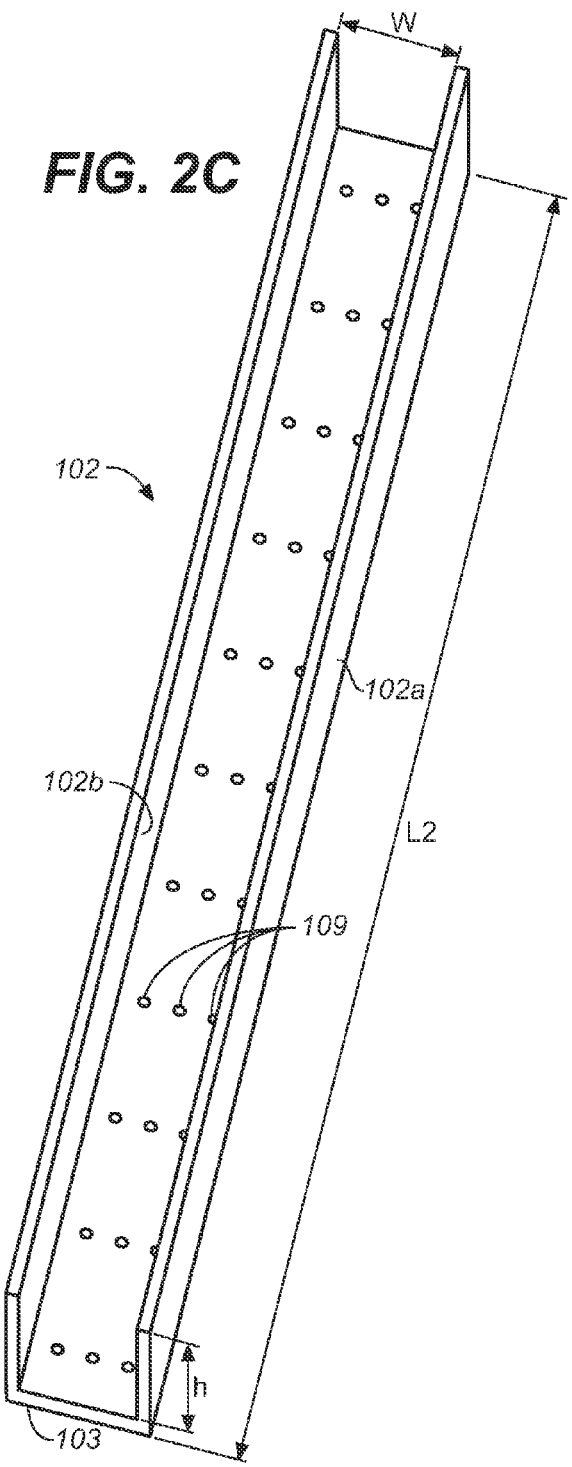
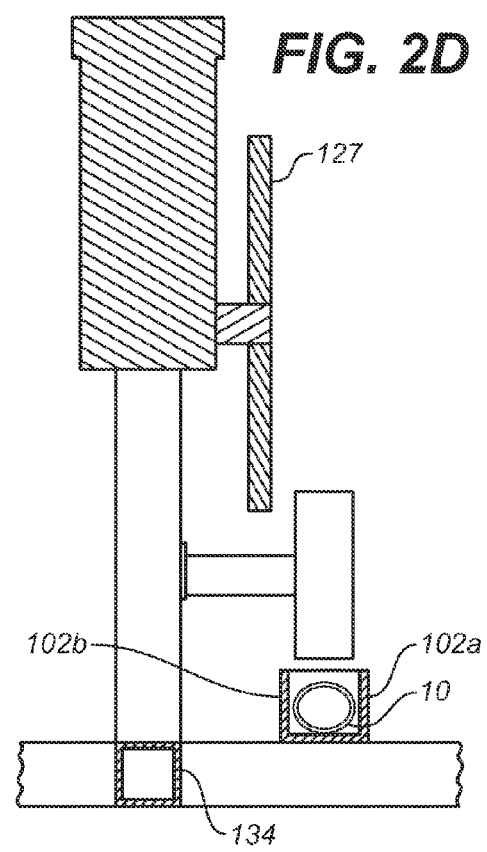

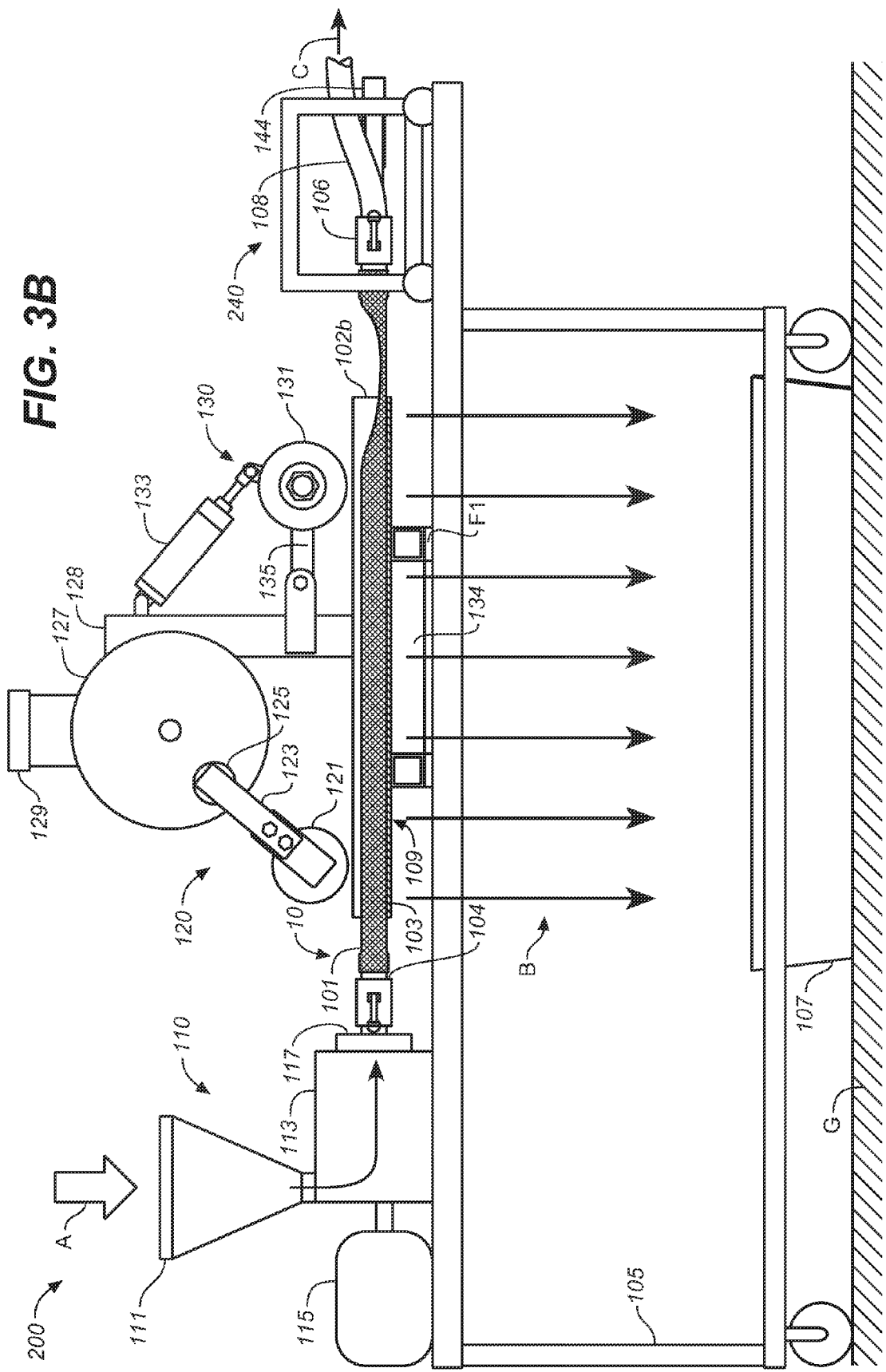

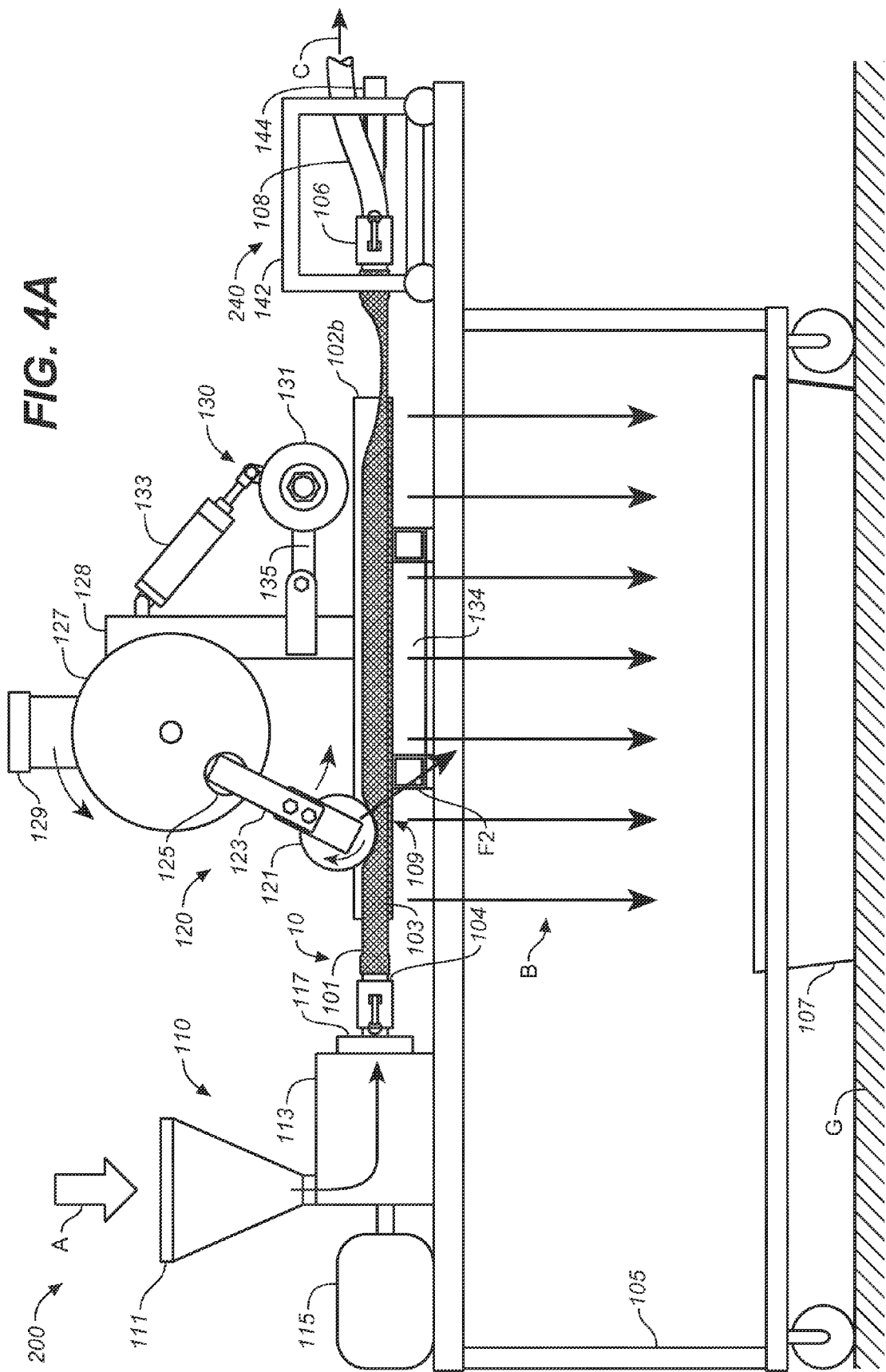

APPARATUS AND METHOD FOR THE TREATMENT OF LIQUID/SOLID MIXTURES

CROSS-REFERENCE TO RELATED APPLICATIONS

This application claims the benefit of U.S. Provisional Application No. 61/226,592, filed Jul. 17, 2009, the entire contents of which are hereby incorporated by reference herein and made part of this specification.

BACKGROUND OF THE INVENTION

1. Field of the Invention

The present invention generally relates to a system and method for treating a mixture of solids and water, and particularly to a method and system for separating or concentrating liquid and solids from slurry.

2. Discussion of the Background

Water with suspended solids may result from agricultural, manufacturing, or natural sources. In some circumstance, it is desired to produce water with fewer solids, and in some circumstances it is desired produce concentrated solids. Equipment has been developed that utilize filters for performing the separation. Such systems typically require intermittent shutting down of the equipment to clean out the filters.

Thus there is a need in the art for a method and apparatus that permits the continuous or pulsatile separation of solids from water at high flow rates. Such a method and apparatus should be operable with a range of solid concentrations and should operate to continuously clean any filters.

BRIEF SUMMARY OF THE INVENTION

The present invention overcomes the limitations and problems of the prior art using devices and/or methods that permit the continuous treatment of slurries.

In certain embodiments, an apparatus is provided to treat a slurry and form a solids-enriched portion and a solids-depleted portion. The apparatus includes a frame, a positive displacement pump, and a passageway. The pump is attached to the frame and has an input to accept a continuous slurry flow and an output to provide the flow at an elevated pressure. The passageway has a first end connected to the pump output, a portion attached to the frame, and a second end. The passageway has a length of an open weave material. While operating the positive displacement pump to provide the continuous slurry, a solids-depleted portion is provided through the open weave material and a solids-enriched portion is provided through the second end.

In certain other embodiments, an apparatus is provided to treat a slurry to form a solids-enriched portion and a solids-depleted portion. The apparatus includes a positive displacement pump and a passageway. The pump has an input to accept a continuous slurry flow and an output to provide the flow at an elevated pressure. The passageway has a first end connected to the pump output, a wall having a wall portion including a porous material, and a second end. While operating the positive displacement pump to provide the continuous slurry, a solids-depleted portion is provided through the wall portion, and a solids-enriched portion is provided through the second end.

In certain embodiments, a method is provided of treating a slurry to form a solids-enriched portion and a solids-depleted portion. The method includes continuously pumping the slurry into one end of a passageway, which has a porous wall portion, and, while continuously pumping, collecting the solids-depleted portion from the porous wall, and collecting the solids-enriched portion from a second end of the passageway.

In certain embodiments, mechanism and methods for manipulating the passageway are provided.

These features together with the various ancillary provisions and features, which will become apparent to those skilled in the art from the following detailed description, are attained by the slurry treatment apparatus and method of the present invention, preferred embodiments thereof being shown with reference to the accompanying drawings, by way of example only, wherein:

BRIEF DESCRIPTION OF THE SEVERAL VIEWS OF THE DRAWING

FIG. 2C is a perspective view of a trough;
FIG. 2D is a sectional view 2D-2D of FIG. 2B;
FIGS. 3A and 3B illustrate the use of a valve, where
FIG. 3A shows the valve in a closed or partially closed configuration,
and FIG. 3A shows the valve in an open configuration;
FIGS. 4A, 4B, 4C, and 4D illustrate sequential times in the operation of a first manipulation mechanism.

Reference symbols are used in the Figures to indicate certain components, aspects or features shown therein, with reference symbols common to more than one Figure indicating like components, aspects or features shown therein.

DETAILED DESCRIPTION OF THE INVENTION

Certain embodiments are described herein that provide apparatus and methods for filtering slurries—that is, a mixture or suspension of solids in a liquid. In general, embodiments of the inventive system accept slurry into a passageway and provide two outputs: a filtered stream that passes through the walls of the passageway, and a concentrated stream that passes through the interior of the passageway. Certain other embodiments accept a continuous slurry stream and provide continuous output stream. Examples of slurries that may be filtered and/or separated include, but are not limited to, the effluent from municipal waste, dairy waste, and food processing. The slurries may further include polymers and/or coagulants that are provided to facilitate treatment.

The embodiments described herein are illustrative, and the system may be scaled to accommodate various flow rates and slurry compositions according to the pump size, filtering passageway length, diameter, and pore size, the number of passageways, and the pressure.

Figure 1A:
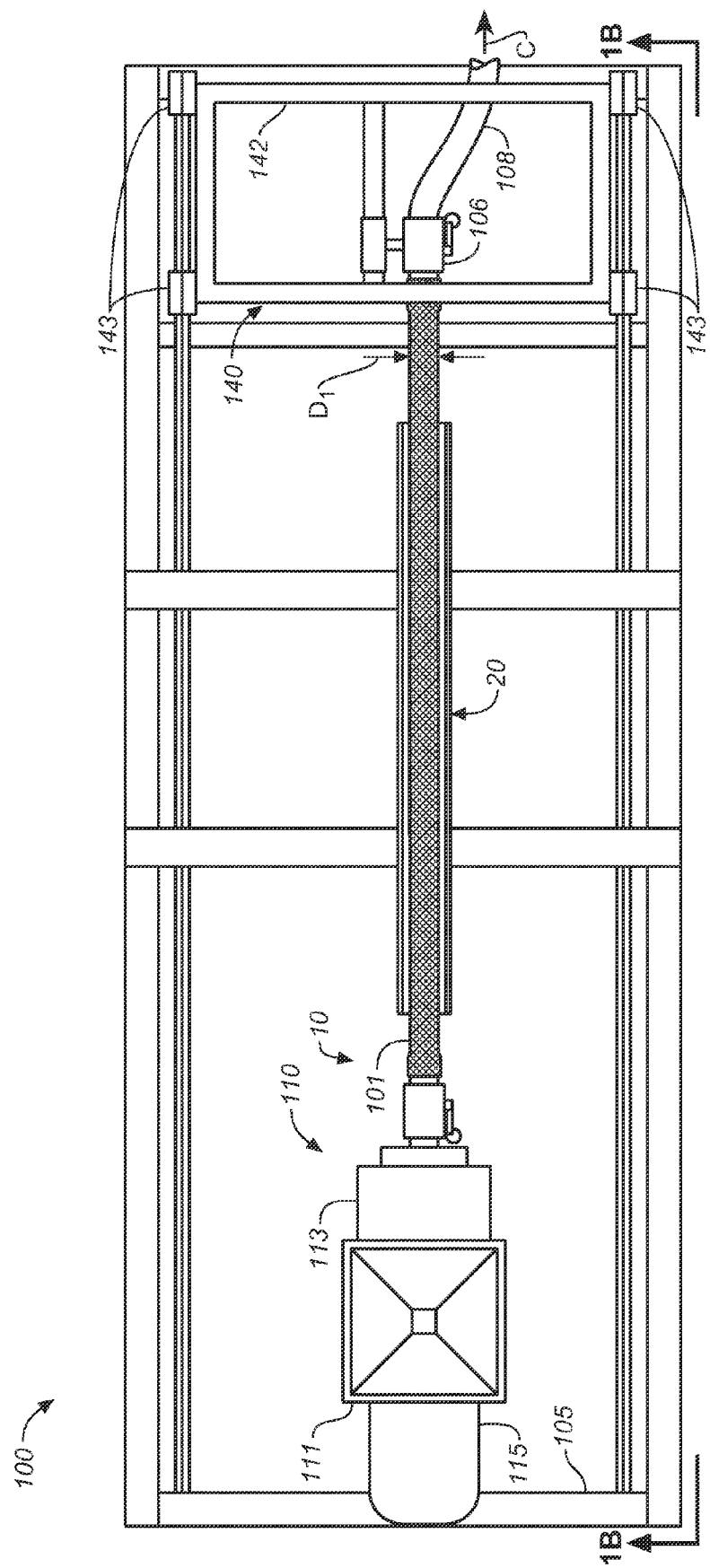
FIG. 1A is a top view of a first embodiment of the system.
Figure 1B:
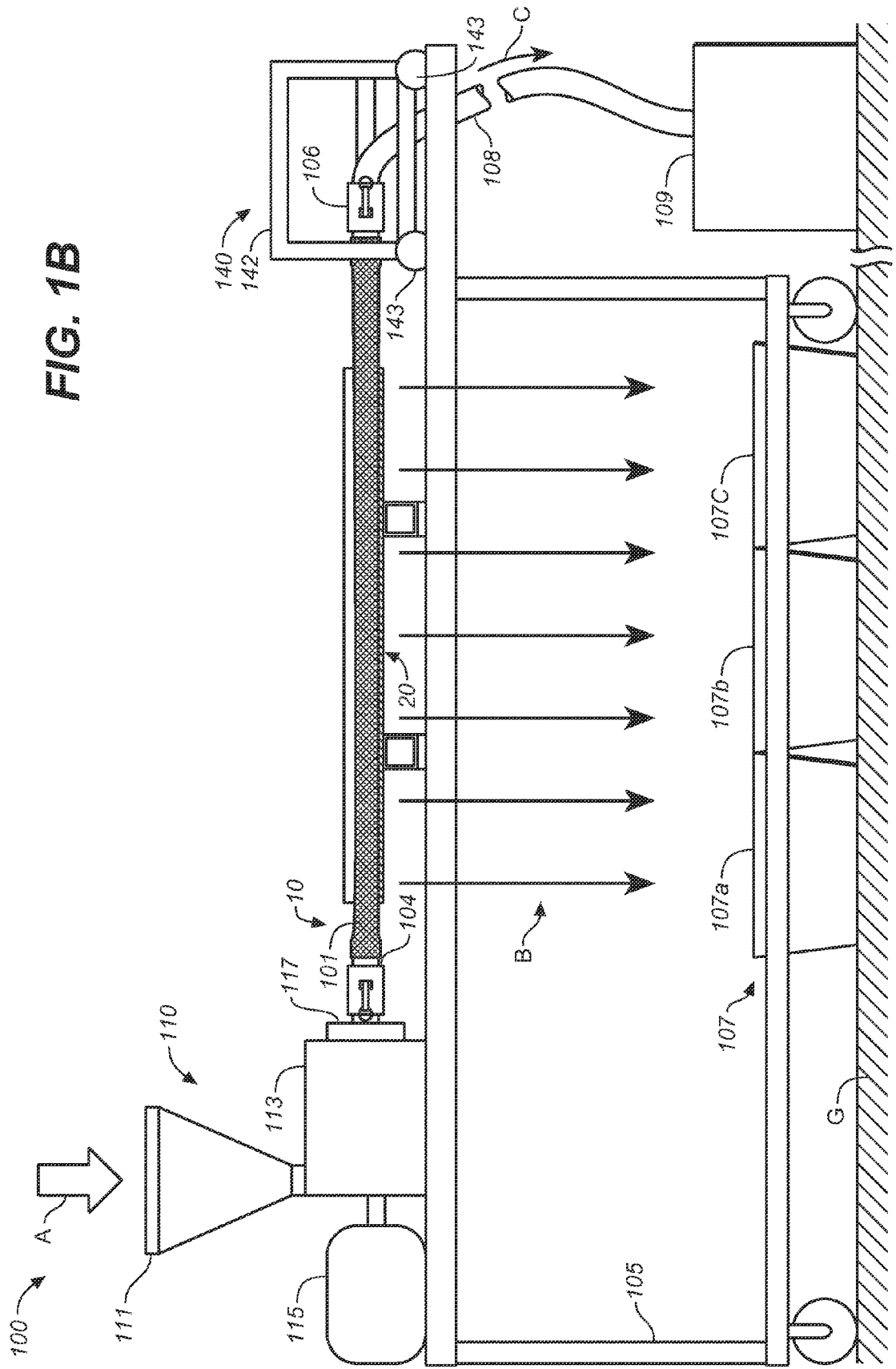
FIG. 1B is a side view 1B-1B of FIG. 1A.

A first embodiment of a system 100 is shown in the schematic of FIGS. 1A and 1B, where FIG. 1A is a top view of the system and FIG. 1B is a side view 1B-1B of the system. System 100 may be supported on the ground G by a frame 105 on which is mounted a mixture intake portion 110, a passageway support 140, a first receptacle 107, and a second receptacle 109. An enclosed tubular passageway 10 has an input end that is attached to mixture intake portion 110 and an output end at receptacle 109, and is further supported by passageway support 140.

Mixture intake portion 110 includes a hopper 111 to accept material, such as a slurry, and a pump 113 powered by a motor 115 with an output 117 to provide pressurized material to passageway 10. A coupling 104 may also be provided to couple output 117 to passageway 101. A pressure transducer (not shown) may also be included within or near pump 113 to provide a measure of the pressure at output 117.

In certain embodiments, pump 113 may be, for example and without limitation, a positive-displacement pump. The use of a positive-displacement pump permits the build up of pressure and continuous flow of slurry through system 100. Pump 113 may thus be, for example and without limitation, a gear pump, a progressing cavity pump (also know as "progressive cavity pump"), a roots-type pump, a peristaltic pump, or a reciprocating-type pump.

In one embodiment, pump 113 is a model A1E progressing cavity pump manufactured by Monyo Inc (Springfield, Ohio 45506), and motor 115 V is a 3 HP motor, and mixture intake portion 110 is capable of pumping 10 gal/min at a pressure 15 psi to 350 psi, and passageway 10 has a diameter D1 of 2.0 inches. In generally the size of the pump and passageway may be larger or smaller, or system 100 may have parallel pumps and/or passageways.

Passageway support 140 includes a frame 142 attached to coupling 106. Frame 142 also includes wheels 143 to permit movement of the passageway support along frame 105.

Passageway 10 is further shown as comprising two portions: a first passageway 101 and a second passageway 108. Passageway 101 extends from a first coupling 104 at mixture intake portion 110 to a second coupling 106 at passageway support 140. Passageway 101 includes a porous material, and thus the walls of the passageway can act as a filter. Passageway 101 is also referred to herein as the filter, the filter hose, or filter tube. Passageway 108 is a low pressure conduit, such as flexible PVC conduit.

In one embodiment, material 101 is an expandable material, and which is both porous and flexible. Thus, for example, the material may be formed from an open weave, preferably of a sturdy synthetic material, such as a polyamide monofilament. One such material is ALTA-FLEXT™ TUFF Heavy Duty Expandable Nylon Monofilament Sleeving (Alta Technologies, Inc., Pennington, N.J. 08534). While such material is generally used as an exterior covering (or sleeving) over hoses harnesses, or cable assemblies, and is referred to as "sleeving," the inventor has found that it exhibits properties making is useful for slurry filtering. When the length of an expanded braided tube is changed under tension, the braiding opens or closes, changing the size of the pores of the material. The openings (pores) that may vary from 10's of microns to fractions of an inch, depending on weave and any tension placed on the sleeving.

The length L1 of material 101 is selected to produce concentrated slurry, and may vary, for a material having a diameter D1 of 1.5 inches, from a L1 of a few inches to several feet.

System 100 may alternative include a vibrating plate 20 that is affixed to frame 105. When alternative vibrating plate 20 is present and/or is actuated, system 100 provides a vibratory motion to passageway 101.

As described subsequently, system 100 may be operated to continuously accept material, such as a slurry A, in mixture intake portion 110, and provide the material at high pressure into passageway 10. A portion of the walls of passageway 101 is porous, and thus may filter a slurry contained under pressure therein. Specifically, the material of passageway 101 is selected to be porous to none, or an acceptable size range, of the solids within slurry A, and also capable of being formed into a passageway capable of withstanding the pressures and abrasive quality of the slurry. As described subsequently material 101 may be, but is not limited to, a braided monofilament.

First receptacle 107 may accumulate the portion of slurry A that passes through and is filtered by the wall of passageway 101 as a solids-depleted portion, or a "slurry filtrate" B, and second receptacle 109 may accumulate the portion of the slurry that continues through passageways 101 and 108 as a solids-enriched portion, or an unfiltered slurry C, referred to herein as a "concentrated slurry." The concentrated slurry may be fluid or may be essentially solids.

In certain embodiments, some solids may permeate passageway 101, and thus the quality and amount of the filtrate B may vary along the length of passageway 101. FIG. 1B illustrates several receptacles, specifically receptacles 107a, 107b, and 107c, which may accumulate filtrate having decreasing amounts of solid materials that pass through the walls of passageway 101.

In alternative embodiments, one or more or receptacles 107 and 109 may include conduits to provide flows to other equipment, or for discharge to the environment.

The operation of system 100 depends on many parameters including, but not limited to: the pressure and flow rate provided by pump 113; the response of material 101 to being pressurized and possible resulting change in pore size of an open weave material, the diameter and length of material 101; the ability of a concentrated slurry to flow through passageway 10; and/or the degree to which the pores in material the material become clogged.

In certain embodiments, system 100 provides a steady-state flow of filtrate and concentrated slurry. Thus, for example, system 100 may operate as follows. A steady stream of slurry A is provided into hopper 111 and motor 115 is operated to pressurize the slurry in pump 113. Slurry A then flows through passageway 10. Since material 101 is porous, the liquid portion of the slurry and possibly smaller solids, permeate the material and leave the passageway as flow B into receptacle 107. Since less liquid remains in the passageway, the amount of liquid permeating material 101 may decrease with distance, as illustrated by the length of the various arrows B. The unfiltered material continues to flow along passageway 10, becoming more concentrated as flow B continues to leave the passageway. After some time, a steady-state operating condition is reached where the slurry continues to concentrate and then flows through passageway 10. A concentrated slurry C, which may contain small amounts of liquid, flows into the passageway comprising a non-porous material 108 and is accumulated in receptacle 109.

In certain embodiments, pump 113 may first be operated at a high flow rate and/or pressure to establish a steady flow of filtrate B and concentrated slurry C, and then be reduced to a lower flow rate and/or pressure.

Further, if material 101 is an open weave material, then the diameter, length, and size of the openings (pores) may change depending on the pressure within passageway 10. Thus, for example, as the pressure in passageway 10 increases, the pore size and diameter D1 may become smaller and the length L1 may increase. Passageway support 140 may move to accommodate changes in length L1 as a result of changes in flow or pressure within passageway 10.

In certain other embodiments, the concentrated slurry does not easily flow through passageway 10, and a pulsatile operating condition may be reached. Thus, for example, system 100 may operates as follows. With pump 113 providing a steady stream of slurry A, the slurry in passageway 10 becomes more concentrated with distance along the passageway. At some position along the passageway the concentration of solids increases to a point at which the concentrated slurry may no longer flow. Thus, for example, the slurry is so liquid depleted and viscous, and/or solidified, that the flow of concentrated slurry stops. At this point, passageway 10 is essentially plugged and the flow C decreases to zero. Since pump 113 continues to provide slurry A into passageway 10, and since the liquid can emerge from passageway 10 as flow B, solids continue to accumulate and the plugged concentrated slurry backs up towards pump 113, and the pressure in the concentrated slurry increases. At some point the pressure in the concentrated slurry is sufficient to move the slurry: the plug is then ejected as flow C. The flow A proceeds into the passageway and the processes repeats.

During pulsatile operation, the pressure within passageway 101 will also be pulsatile. The increase and decrease in pressure within an open weave material may change the size of the openings, allowing lodged solids to either pass through the walls of the passageway or to flow along the passageway, essentially cleaning the filter provided by the walls of passageway 101, and allowing further operation of system 100.

In certain embodiments, alternative vibrating plate 20 is provided and/or is actuated to vibrate passageway 101. Vibration of passageway 101 may act to loosen accumulated solids within passageway pores and/or facilitate the flow of solids-enriched material through passageway 101 as flow C.

ALTERNATIVE EMBODIMENTS

Under certain circumstances it may be desirable to provide additional manipulation of the flow within passageway 101. Thus, for example, a higher pressure in passageway 101 may be necessary to filter the slurry, and thus a valve or some mechanism for restricting the flow may be useful. In addition, for example, the interior and/or pores of passageway 101 may become clogged with material, and thus mechanisms that manipulate a portion of passageway 10 or the flow therein may act to dislodge solids and permit flow of concentrated slurry C and to continuously clean the pores of the passageway. The alternative embodiments provide means for manipulating passageway 10 to restrict the flow along or through the passageway. The means for manipulating include, but are not limited to, pushing, flexing, shaking, or vibrating passageway 10, including but not limited to some or all of passageway 101, and/or deforming or changing the walls of passageway 10, including but not limited to some or all of passageway 101, to modify or change the size or shape of the cross-section of the passageway.

Figure 2A:
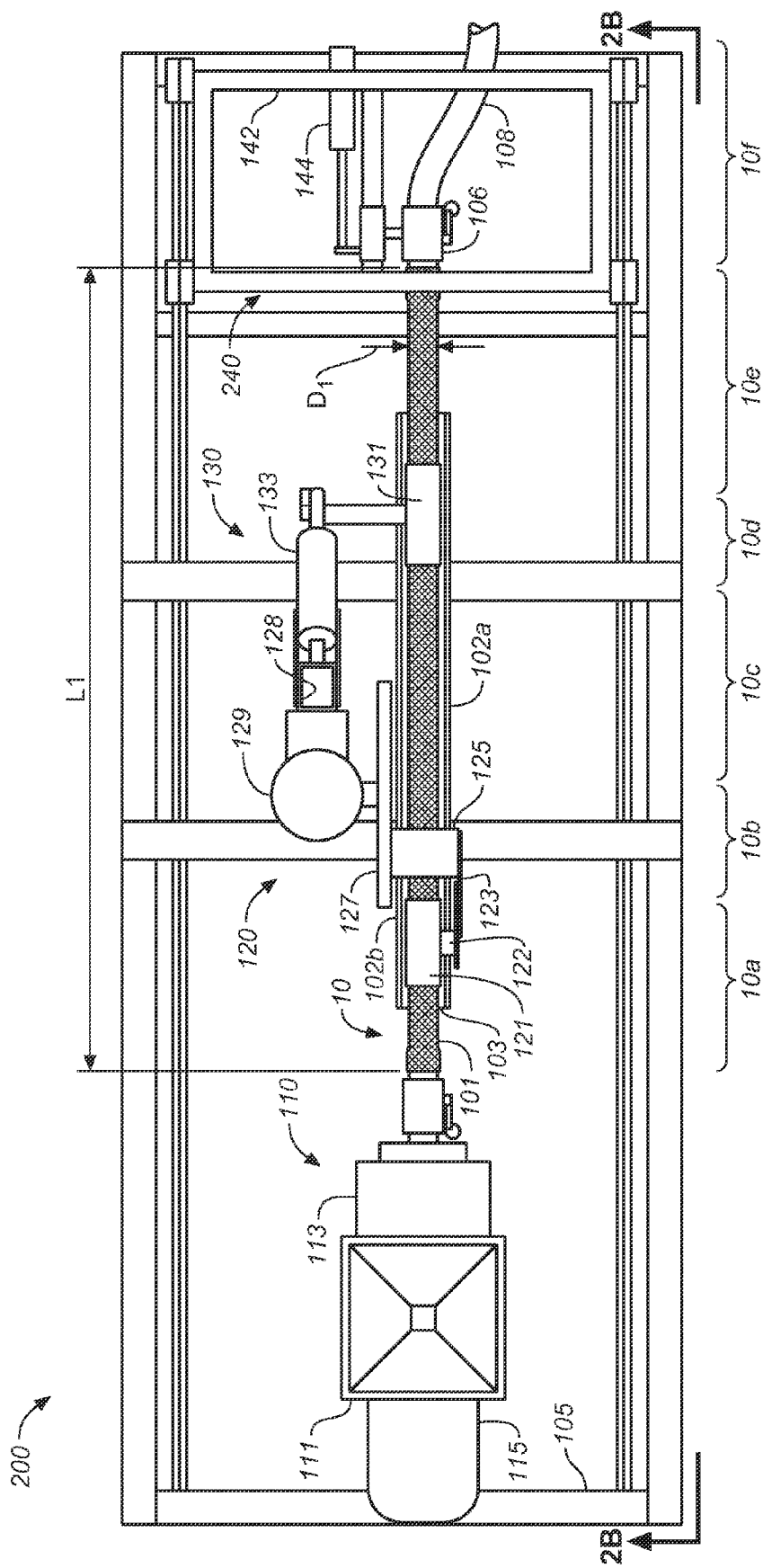
FIG. 2A is a top view of an alternative embodiment of the system.
Figure 2B:
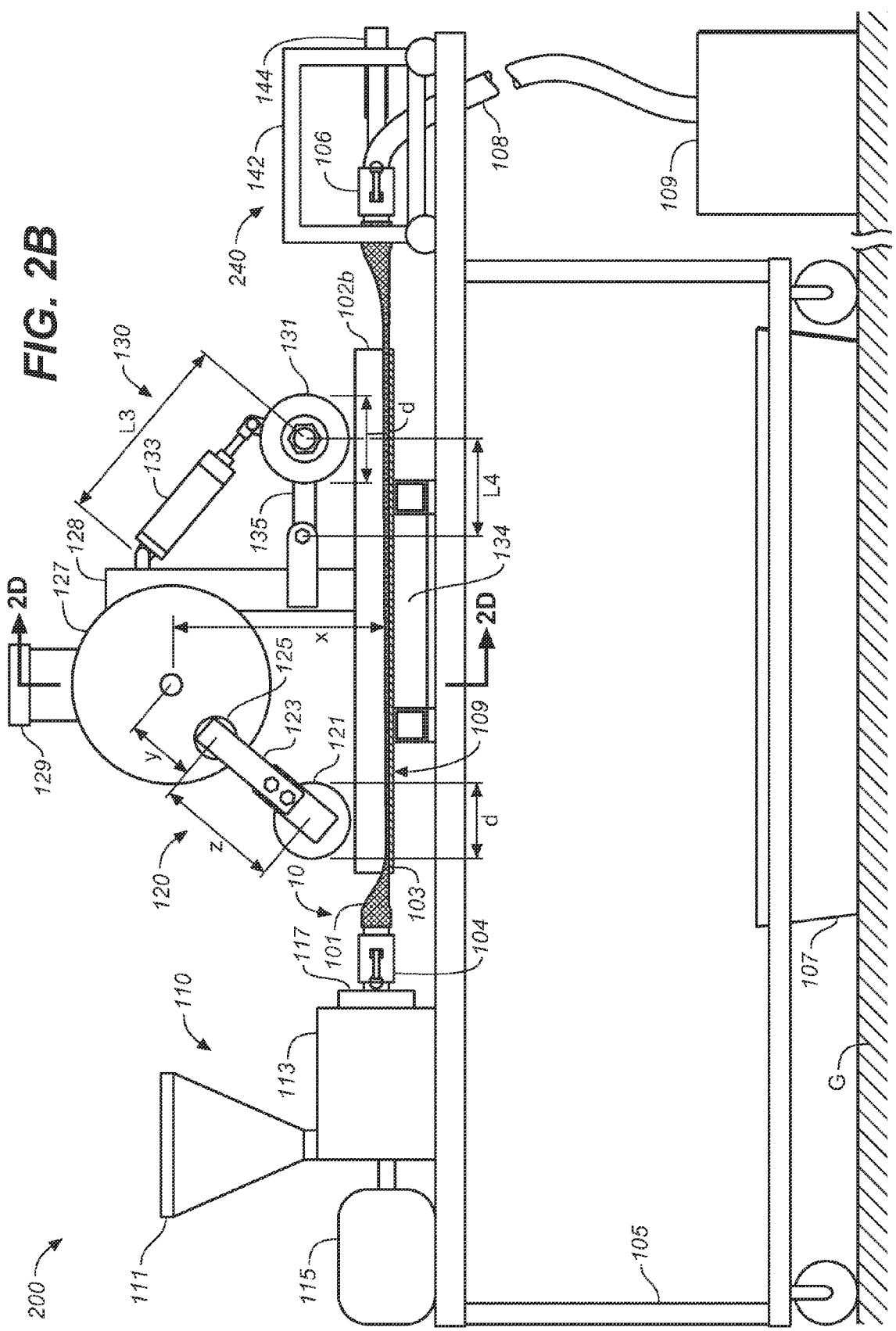
FIG. 2B is a side view 2B-2B of FIG. 2A.

An alternative embodiment of system 100 is shown as system 200 in FIGS. 2A, 2B, 2C, and 2D, where FIG. 2A is a top view of the system, FIG. 2B is a side view 2B-2B of the system, FIG. 2C is a perspective view of a trough 200, and FIG. 2D is a sectional view 2D-2D. System 200 may be generally similar to the embodiment illustrated in FIG. 1A and 1B, except as further detailed below. Where possible, similar elements are identified with identical reference numerals in the depiction of the systems 100 and 200.

As shown in FIGS. 2A and 2B frame 105 includes one or more mechanisms to press, pinch, expand, and/or contract the passageway, including but not limited to, a first manipulation mechanism 120, a valve 130, and a second manipulation mechanism 240.

FIG. 2C shows trough 102, which supports passageway 10, as shown in FIGS. 2A and 2B. Trough 102 includes sides 102a and 102b and a bottom 103, and has a width W, a height H, and a length L2. In certain embodiments, it is preferred that width W be large enough to contain a passageway of nominal diameter D1 when flattened, and thus may be greater than approximately (t/2) D1, and that the height H be approximately equal to the diameter D1. Holes 109 allow liquid to flow through trough 102 may be provided along bottom 103.

In the view of FIG. 2B, side 102a of trough 102 has been cut-away to more easily see the structure of system 200.

Various portions of passageway 10 may perform different functions and may be formed from one or more materials. At least a portion of passageway 10 is porous or has openings permeable to the slurry liquid while trapping a substantial amount or all of the suspended solids, thus permitting concentrated slurry or a solid material to flow through the center of passageway 10, and a filtered flow through the porous material. In certain embodiments, some portions of passageway 10 are sturdy and flexible to permit manipulation or pinching or restriction in a valve; and other portions provide a low pressure conduit.

As shown in FIGS. 2A, passageway 10 includes: a first portion 10a that extends from mixture intake portion 110 to first manipulation mechanism 120; a second portion 10b that extends through the first manipulation mechanism; a third portion 10c that extends from the first manipulation mechanism to valve 130; a fourth portion 10d that extends through the valve; a fifth portion 10e that extends from the valve to second manipulation mechanism 240; and a sixth portion 10f that extends downstream from the second manipulation mechanism. The number, order, and spacing of portions 10a-10f are for illustrative purposes, as they may aid in an understanding or description of various embodiments of the invention, and are not meant to limit the scope of the present invention.

Passageway 10 may be formed from one or more materials, which may or may not correspond to the various portions 10a-10f. In system 100, a material 101 is described as being porous and flexible, and comprising portions 10a, 10b, 10c, 10d, and 10e, and a material 108 is described as being a conduit and comprising portion 10f though various other materials or combination of materials may be used for the different portions.

Portion 10a, which extends from output 117 is formed or includes a material 101 that is preferably porous, to permit only the liquid in a slurry to flow through the material, and is strong, to withstand the pressure at output 117.

Part of portion 10a, portions 10b, 10c, 10d, and part of portion 10e are supported by trough 102, as shown in detail in FIGS. 2A-2C. Trough 102 is supported by stand 105, as illustrated in FIGS. 2A and 2B, and presents bottom 103 as a surface against which portions 10b, 10c, and 10d may be manipulated. Holes 109 provide a route for liquid that is forced from the passageway to flow into receptacle 107.

First manipulation mechanism 120 is shown in FIGS. 2A, 2B, and 2D. Depending on various adjustments, mechanism 120 includes an element, such as a wheel 121, that pushes on passageway 10b to progressively manipulate (either flex or flatten) a length of the passageway. Specifically, mechanism 120 includes a motor 129, a flywheel 127, a tensioning support 125, an adjustable length wheel extension 123, and an axle 122 supported by wheel extension and about which wheel 121 may rotate. Motor 129 is further attached to a vertical support 128, which is affixed to stand 105 by support 134, as shown in FIG. 2D. Portion 10b, as shown in the cross-sectional view of FIG. 2D, is positioned between trough 102 and wheel 121: when motor 134 is activated, flywheel 127 rotates, and wheel 121 is periodically forced against portion 10b, as discussed subsequently.

In one embodiment, as illustrated in FIG. 2B, the spacing from the center of flywheel 127 to bottom 103 is x, the distance from the center of the flywheel to tensioning support 125 is y, the distance from the tensioning support to axle 122 is an adjustable length z, and the diameter of wheel 121 is d. In certain embodiments, z is adjusted so that the distance from the center of flywheel 127 to outer of wheel 122 (y+z+d/2) can flatten passageway 10b (that is, z<x−y−d/2), allowing wheel to compress portion 10b as the flywheel rotates. As discussed subsequently, tensioning support 125 includes a torsion spring to permit the wheel 121 to rotate in an opposite direction while permitting flywheel 127 to continue to rotate.

In certain other embodiments, the distance from the center of flywheel 127 to outer of wheel 122 is adjusted to not completely flatten passageway 10b (that is, (x−y−d/2−D1) <z<(x−y−d/2)), allowing wheel to flex portion 10b as the flywheel rotates.

In one embodiment, which is not meant to limit the scope of the invention, motor 134 is a 240 V motor rated at 3 HP, and which rotates at 1750 revolutions per minute; flywheel 127 has a diameter of 14 inches and a mass of 15 lbs; x is 15 inches, y is 7 inches; and z is 6 inches. Tensioning support 125 includes a torsion spring having a force constant of 60 lbs. Wheel 121 has diameter d of 5 inches, and a width slightly less than the width W, and has a rubber outer surface.

In one embodiment, the length z is adjustable from a length of 4 inches to a length of 8 inches. In another embodiment, the length y is adjustable by having mounting holes in flywheel 127 at several different distances from the flywheel center, with a distance y of 4, 5, 6, 7 or 8 inches.

Valve 120 is shown in FIGS. 2A and 2B. Depending on various adjustments, valve 120 includes an element, such as a wheel 131, that pushes on passageway 10d to partially or completely restrict the flow through the passageway. Valve 130 includes a piston 133 and a linkage 135 that are both attached to stand 105 by support 134 and wheel 131. Portion 10d is positioned between trough 102 and wheel 131. The actuation of piston 133 can either flex passageway 10d, increasing the resistance to flow and thus provide a higher mean pressure in portions 10a, 10b, and 10c, or can completely flatten the passageway, acting as a "pinch valve."

In one embodiment, which is not meant to limit the scope of the invention, wheel 131 has diameter d of 4 inches, and a width slightly less than the width W, and has a rubber outer surface. Piston 133 has an extendible from length L3, and linkage 135 has a length L4. As one example, L3 may be varied from 11.5 to 15.5 inches, and L4 is 6 ½ inches. Extending L3 to the maximum. In one embodiment, which is not meant to limit the scope of the invention, wheel 131 has diameter d of 4 inches and a width slightly less than the width W, and has a rubber outer surface. Piston 133 has an extendible from length L3, and linkage 135 has a length L4.

Extending L3 to the maximum length thus forces wheel 131 against passageway 10 with a force F1. Depending of the magnitude of force F1, valve 130 may either restrict the flow entirely, or open slightly to maintain a certain pressure within passageway 10.

Second manipulation mechanism 240 includes a piston 144 that is attached to stand 105 by a support 142. Piston 144 is further coupled to coupling 106, which may be coupled to portions 10e and 10f. As discussed subsequently, when piston 144 is extended and contracted, coupling 106 moves to extend or contract one or more portions 10a-10e. The effect on open weave material 101 is to open and close the weave of the material.

While system 100 and 200 are shown as including mechanisms 20, 120 and 240 and valve 130, it is understood that alternative embodiments may include none, or only some, of these mechanisms, or may include additional valves or mechanisms.

MODES OF OPERATION

In certain embodiments, the extension of piston 133 may be adjusted so that valve 130 partially restricts the flow through passageway 10 and thus maintains a higher pressure within portions 10a-10c. The adjustment may, for example, be provided by a control circuit that operates off a pressure measurement in passageway 10. Valve 130 may thus be activated initially, upon startup of system 100 to achieve a high pressure in passageway 10, or during operation, to maintain a high pressure in the passageway.

In certain other embodiments, mechanism 130 is used to urge the flow of concentrated slurry through passageway 10. In certain other embodiments, support 140 is a manipulation mechanism that may be used to adjust the length, and thus porosity of an open weave material 101.

Figure 3A:
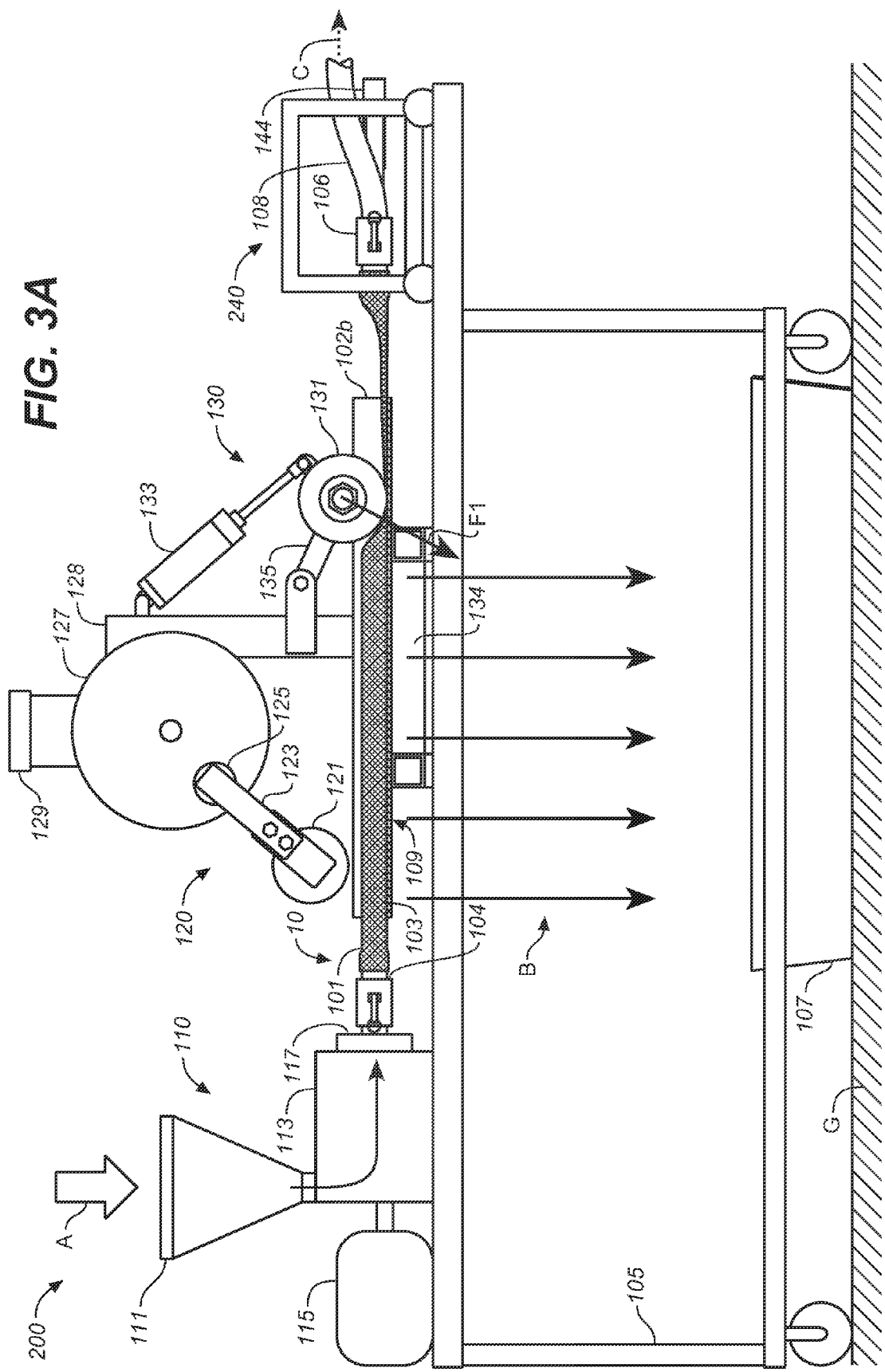

FIGS. 3A and 3B illustrate the use of valve 130, where FIG. 3A shows the valve in a closed or partially closed configuration, and FIG. 3A shows the valve in an open configuration. As shown in FIG. 3A, a slurry A is provided to hopper 111 and motor 115 is started to provide a flow of slurry into passageway 10, and piston 113 is extended to provide a force F1 on portion 10d. For a sufficient large force F1, wheel 131 pinches off portion 10d, and no flow occurs through that portion.

With portion 10d pinched off, the pressure increases in portions 10a-10c increases, and a flow B of filtered liquid passes through material 101 and holes 109, or otherwise out of trough 102, and into receptacle 107. When a sufficiently high pressure is achieved in passageway 10, piston 113 is released, as shown in FIG. 3B, and a concentrated slurry C flows into receptacle 109.

In an alternative embodiment, force F1 partially restricts the flow through passageway 10 when the sufficiently high pressure is reached within passageway 10. For this embodiment, wheel 131 retracts to permit passageway 10 to partially open certain pressure is reacted within the passageway, and a flow C occurs, as indicated by the dashed arrow C in FIG. 3A.

Concentrated slurry C continues towards receptacle 109, with a large enough pressure drop to maintain the sufficiently pressure in passageway 10.

FIGS. 4A, 4B, 4C, and 4D illustrate sequential times in the operation of manipulation mechanism 120. As shown in FIGS. 4A-4D, with motor 129 is operating, flywheel 127 rotates and wheel 121 periodically contacts portion 10b.

As shown in FIG. 4A, wheel 121 contacts portion 10b, and counter-rotates and presses on the material with a force F2 generally along the flow direction of the slurry. The contact of wheel 121 on portion 10b flexes the portion and changes the cross-sectional area of the portion.

Figure 4B:
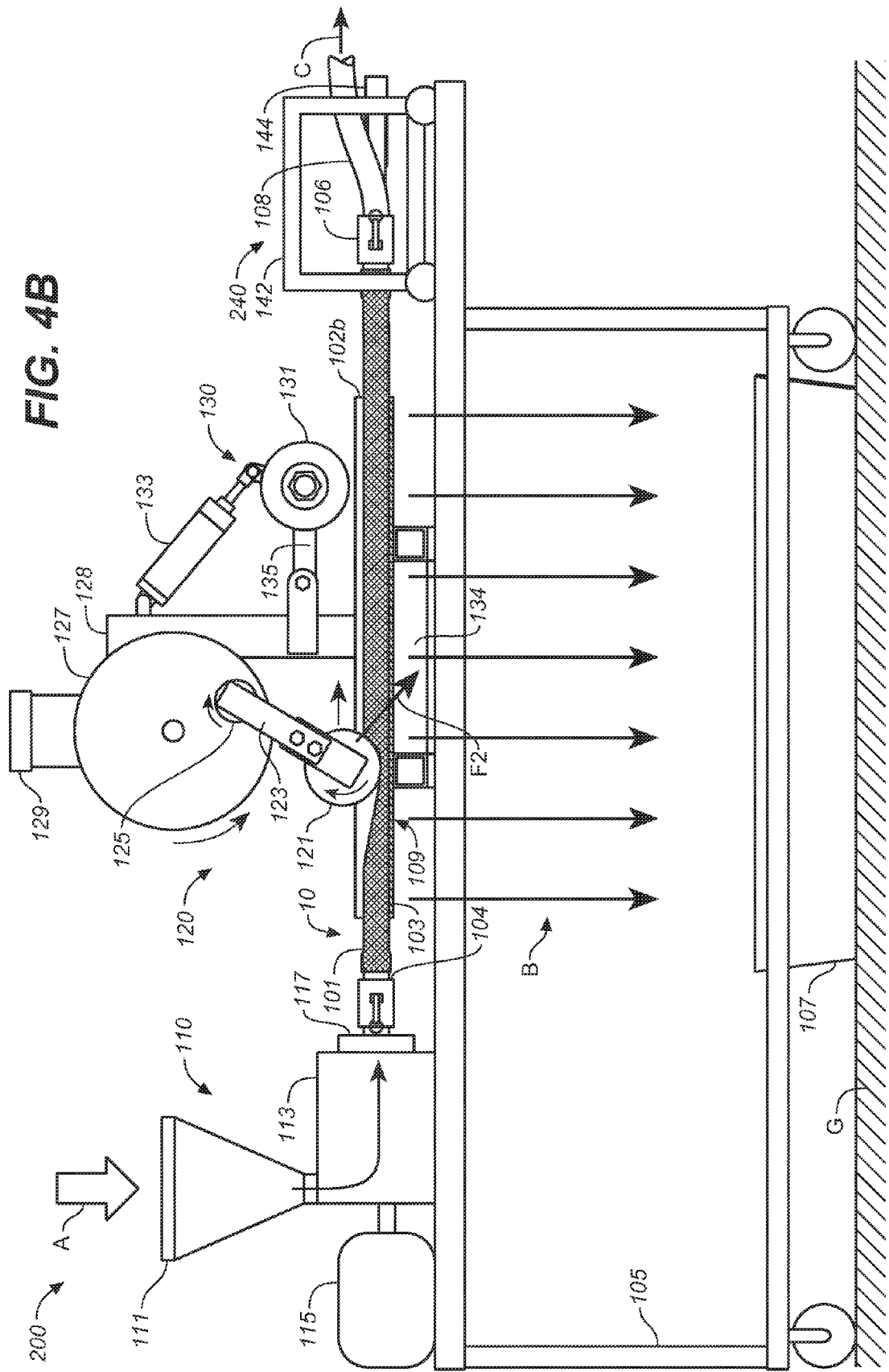

As flywheel 127 continues to rotate, portion 10b progressively moves. As noted above, the distance from the center of flywheel 127 to bottom 103 is adjustable. In one embodiment, the distance from flywheel 127 to bottom 103 is less than the distance from the center of the flywheel to the outer of wheel 121, and wheel 121 flattens portion 10b as it progresses. As shown in FIG. 4B, as flywheel 127 rotates, tensioning support 125 counter-rotates to accommodate the spacing and provide additional force F2 on portion 10b. With wheel 121 thus contacting passageway 10, the material in the portion 10b is squeezed along passageway 10 as flow C.

In an alternative embodiment, the distance from flywheel 127 to bottom 103 is greater than the distance from the center of the flywheel to the outer of wheel 121, and wheel 121 progressively deforms, but does not flatten, portion 10b as it progresses.

Figure 4C:
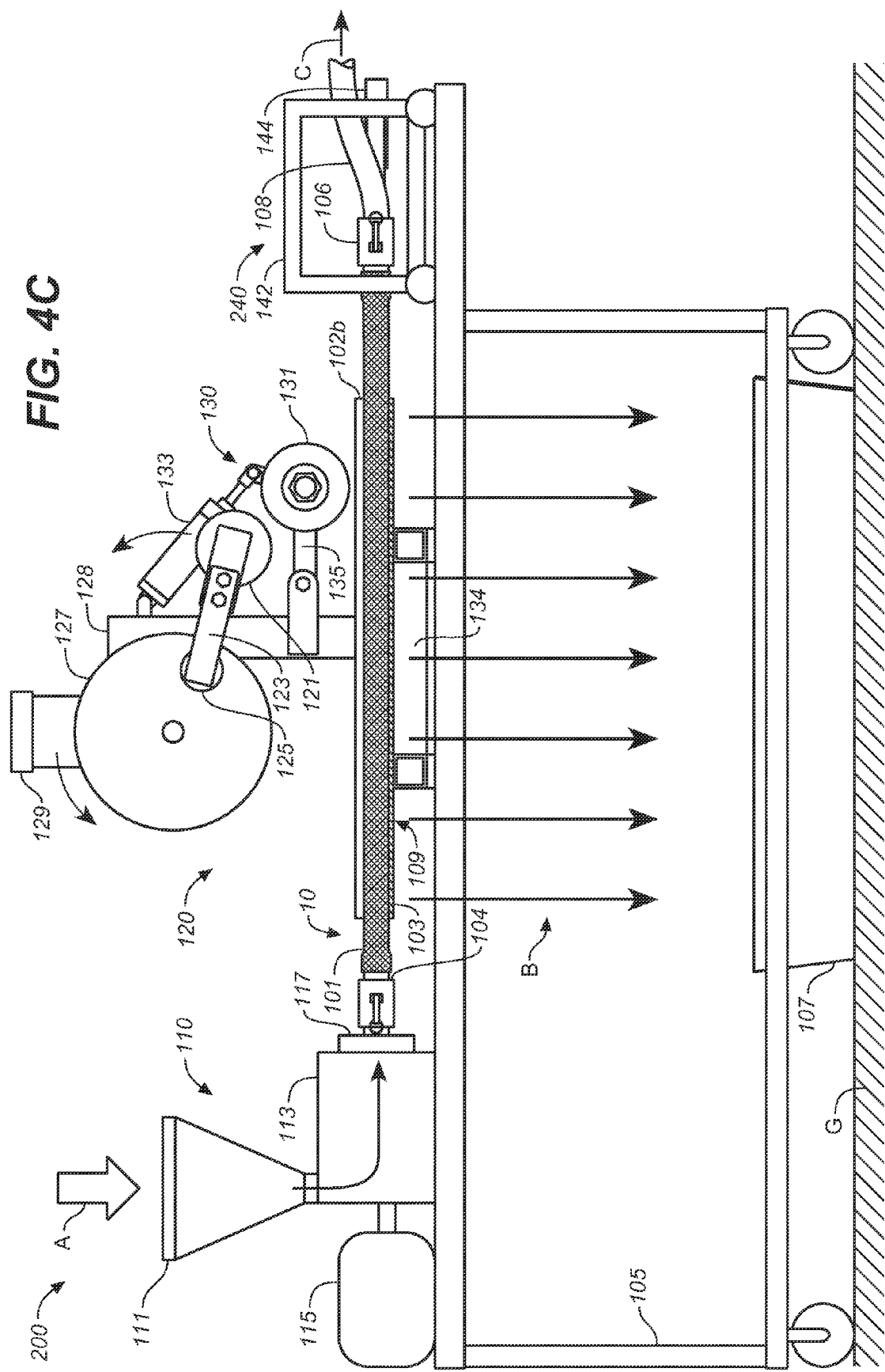
Figure 4D:
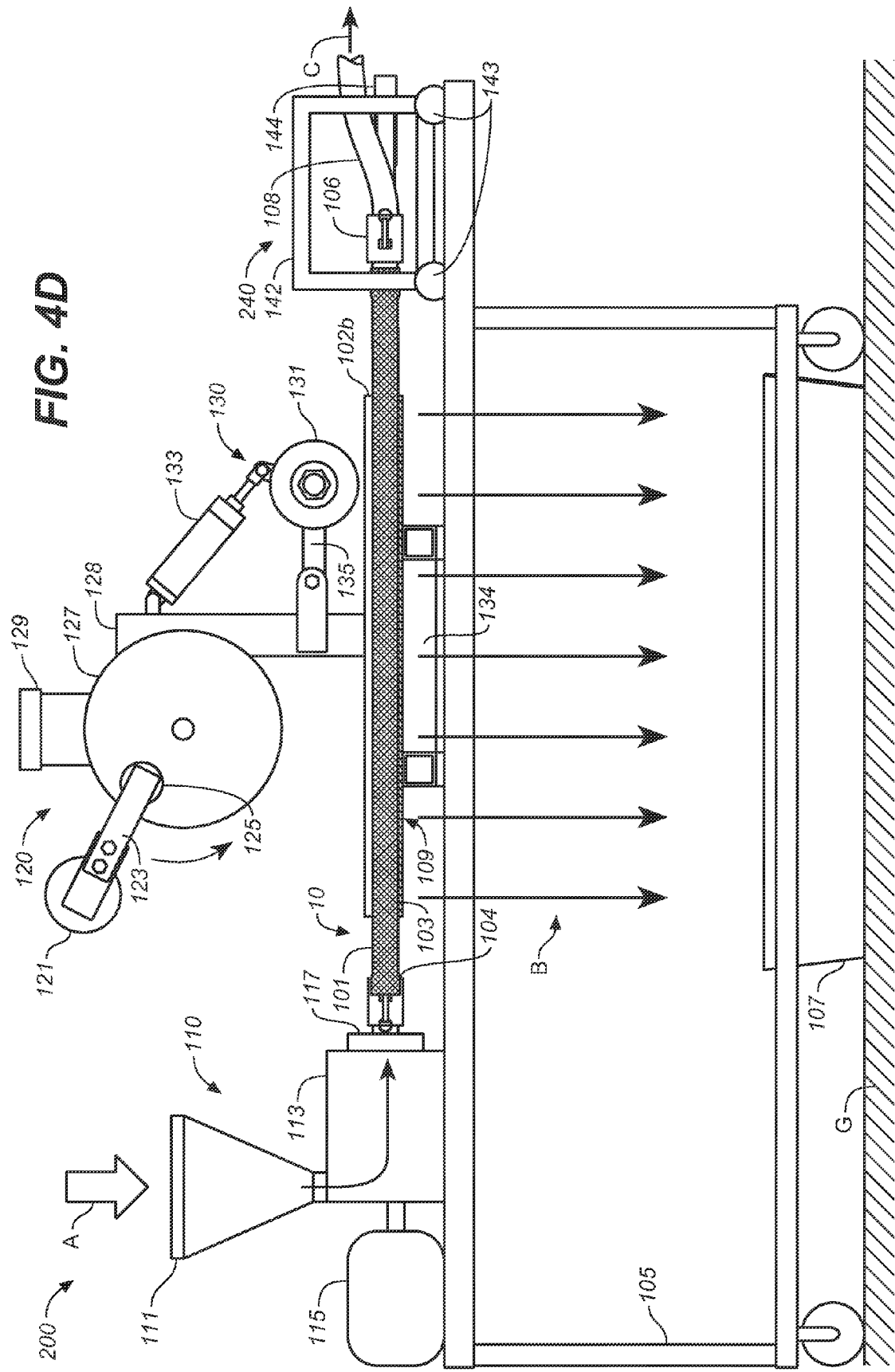

At a slightly later time, wheel 121 no longer contacts portion 10b, and wheel continues around, as shown at sequential times in FIGS. 4C and 4D, until the wheel again contacts passageway 10, as in FIG. 4A.

Figure 5A:
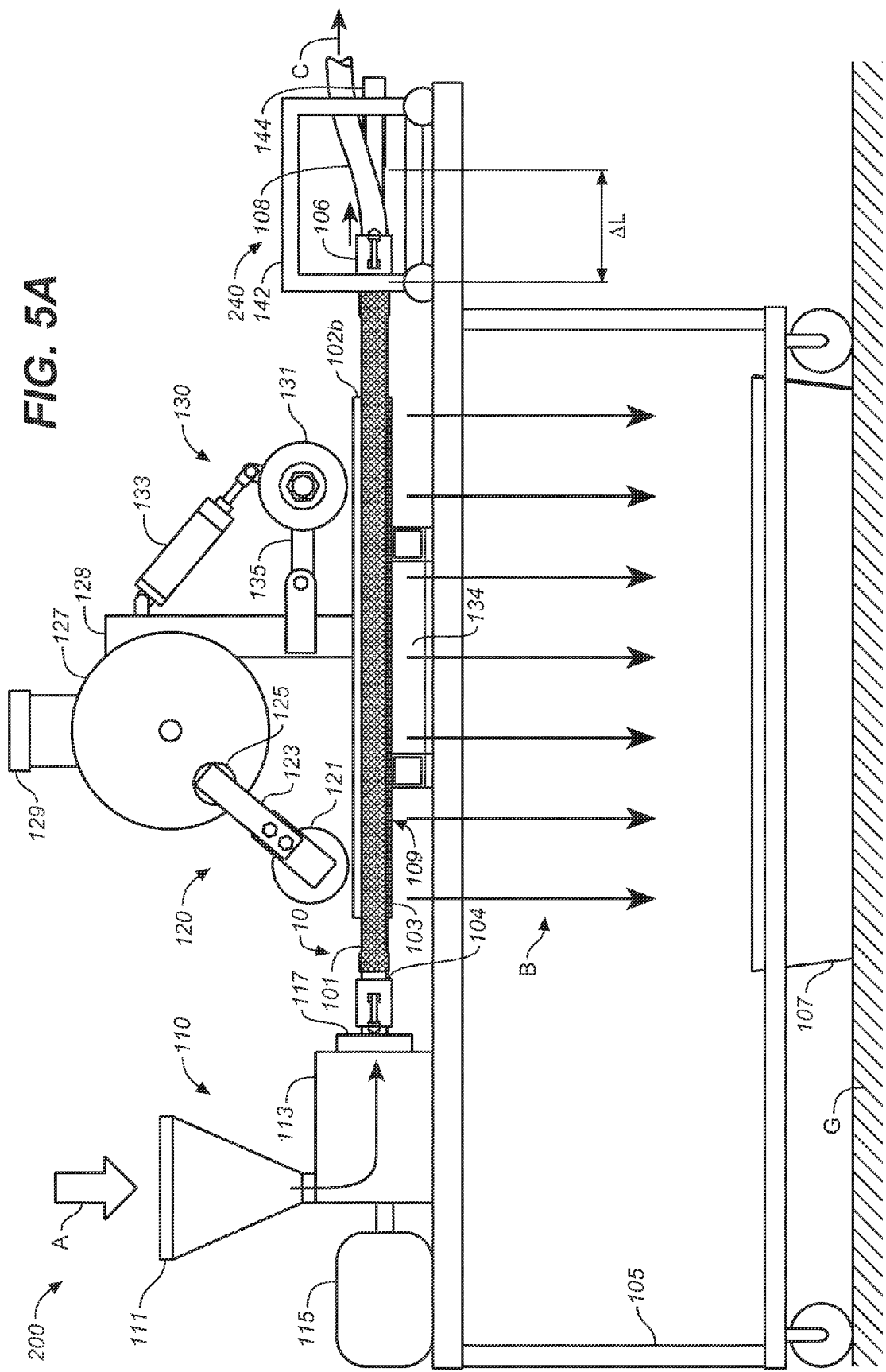
FIGS. 5A and 5B illustrate sequential times in one embodiment of the operation of a second manipulation mechanism.
Figure 5B:
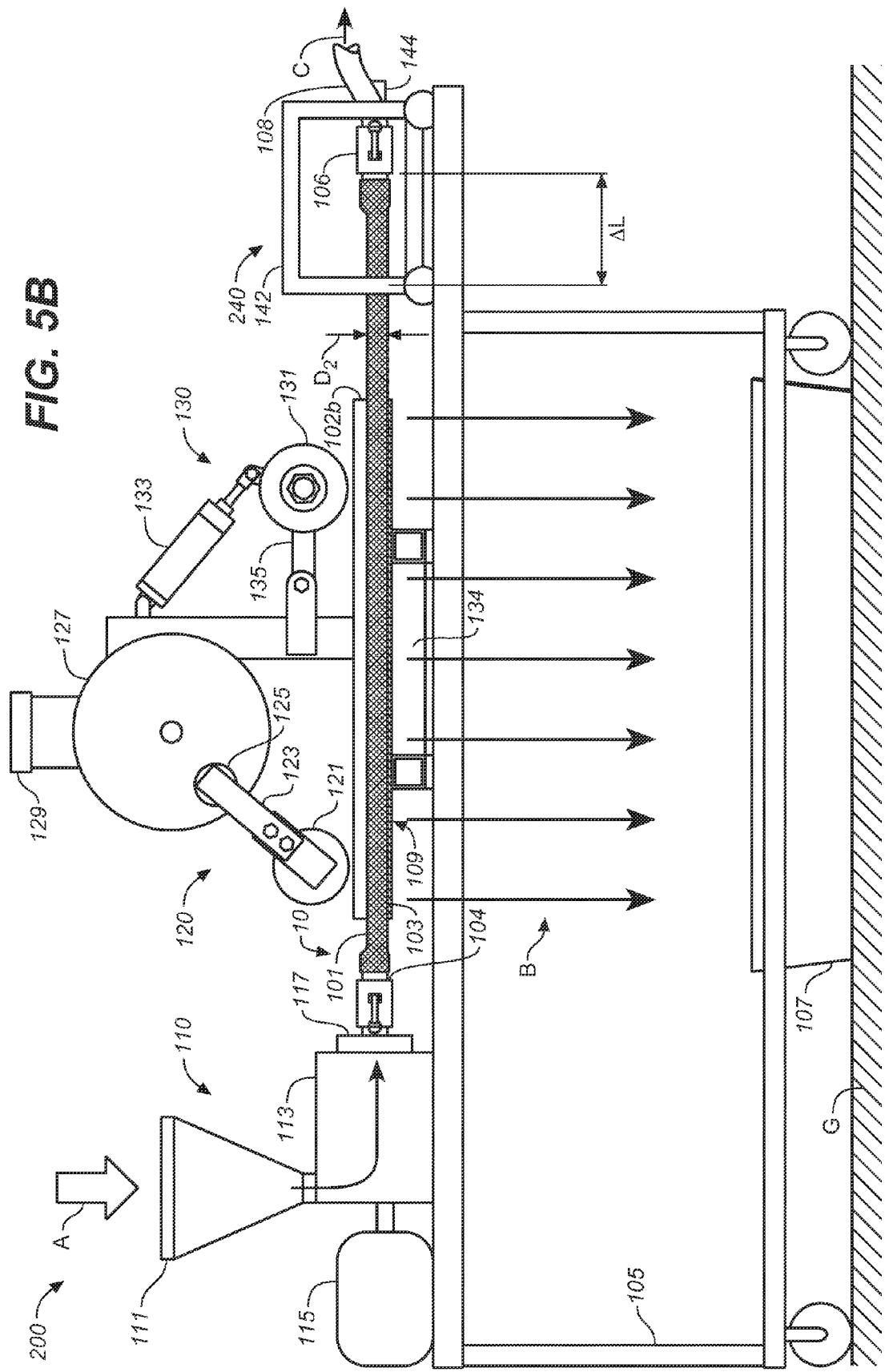

FIGS. 5A and 5B illustrate sequential times in one embodiment of the operation of manipulation mechanism 240. As shown in FIGS. 5A and 5B, piston 144 oscillates to move coupling 106 back and forth by a distance AL with wheels 143 locked in place. This increasing the length of material 101 may decrease the diameter of passageway 101 to a slightly smaller value of D2. In addition, for an open weave material 101, the changing length changes the size of the braid openings. The oscillation of the length, along with the pressure provided by pump 113, urges flow C through passageway 10.

In certain embodiments, the flexing of the tube by mechanism 240 may dislodge solids that may collect within the pores, and permits the solid flow through passageway 10. In this way mechanism 140 may keep material 101 relatively clear of solids and prevents it from clogging up.

EXAMPLES

Systems 100 and 200 have been tested on the effluent from several sources including; municipal bio-waste dairy wastewater, a chicken processing plant, and waster water stream consisted of corn and potato particles.

Slurry particles sizes from these tests had nominal sizes ranging from about 100 micros to ⅜". It was found by the inventor that the pore size of an open weave passageway may be reduced by pulling on (increasing the length of) the passageway. Thus, for example, the pores in passageway 101 including an ALTA-FLEX™ TUFF Heavy Duty Expandable Nylon Monofilament Sleeving, model 78/84, and having a 5 strand monofilament, bias weave, 2" diameter, were used in these tests.

The tests were conducted with pump 113 providing output at a pressure of from 5 to 125 psi. It was found that preferred pressures are from 5-25 psi, since at higher pressures a mechanical shearing of the polymers/coagulants used in the pre-process treatment of the waste water stream may be broken.

Example 1

In one test, dairy waste was treated This waste includes manure wash-down from stalls and milking parlor, fats, oils, grease. The wash-down water contained 13,000 ppm solids. The particle size ranged from the size of undigested alfalfa hay (approximately 2" long×1/16" wide) to very fine particles of approximately 200 microns in size. In addition, polymers and a Bentonite compound was added to facilitate treatment of the wash-down water System 200 was operated using passageway 101 formed from ALTA-FLEX™ # 78/84, 5 strand monofilament, bias weave, 2" diameter, length ranged from 24" to 48". Pump 113 was operated with a flow rate of approximately 5 gallons per minute.

The results produced solids in stream C having solids concentration exceeding 30%, with the remainder being collected in stream B, with system 200 operating continuously for one day without any sign of clogging of the passageway walls.

Example 2

In another test, biowaste comprising residential waste water was treated. This waste included 4% solids of approximately 300 micron in size.

System 200 was operated using passageway 101 formed from a 72 inch length of ALTA-FLEX$^{SM}$-# 78/84, 5 strand monofilament, bias weave, 2" diameter, length ranged from 24" to 48". Pump 113 was operated with a flow rate of approximately 5 gallons per minute.

The results produced solids in stream C having solids concentration exceeding 20%, with the remainder being collected in stream B, and with system 200 operating continuously without any sign of clogging of the passageway walls.

Example 3

In another test, a food waste water stream was treated. This waste stream included 8% solid particles from the manufacture of hominy (corn) and soups. The waste did not include meat products. The corn particles were from 100 microns to ⅜" in size System 200 was operated using passageway 101 formed from a 60 inch length of ALTA-FLEX™-# 78/84, 5 strand monofilament, bias weave, 2" diameter, length ranged from 24" to 48". Pump 113 was operated with a flow rate of approximately 10 gallons per minute.

As one example of a start-up, or "priming" process, the flow of slurry stream A was started and passageway 101 was tensioned, pulled or stretched, to reduce the pore size down a size that captured particles in the 100 micron size range. Solid particles then accumulated in the walls of passageway 101, and eventually stream B stopped flowing, the pore being clogged. At this point the tension on passageway 101 was relaxed, shortening the passageway length and slightly opening the pores, resulting in a steady flow of streams B, and C.

During steady operation, the rotational speed of the flywheel 124 was adjusted to produce a solids concentration in stream C, as desired. In general, the slower the speed of flywheel 124, the drier the material in stream C. Alternatively, it was found that a longer passageway 101 also results in a drier material in stream C.

The results produced solids in stream C having solids concentration exceeding 25%, with the remainder being collected in stream B. System operated without needing to be cleaned.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner, as would be apparent to one of ordinary skill in the art from this disclosure, in one or more embodiments.

Similarly, it should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Thus, while there has been described what is believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

I claim:

1. An apparatus to treat a slurry to form a solids-enriched portion of the slurry and a solids-depleted portion of the slurry, said apparatus comprising:
 a frame;
 a positive displacement pump having an input to accept a continuous slurry flow and an output to provide the continuous slurry flow at an elevated pressure;
 a motor for powering said pump;
 a valve including a piston, linkage and a valve wheel;
 a passageway having a first end connected to said pump output, and a second end attached to said valve, wherein a length of said passageway is an open weave material;
 a first manipulation mechanism including a wheel attached to a flywheel; and
 a trough, wherein said first manipulation mechanism, said valve and said trough are mounted to said frame, and wherein said positive displacement pump provides a continuous flow of slurry into said passageway, and wherein said first manipulation mechanism acts on said passageway in conjunction with said valve to force a portion of liquid contained in said slurry through said open weave to provide a solids-enriched portion of slurry at said second end.

2. The apparatus of claim 1, wherein said first manipulation mechanism acts on said passageway periodically.

3. The apparatus of claim 1, wherein said first manipulation mechanism acts on said passageway intermittently.

4. The apparatus of claim 1, further including a second manipulation mechanism to increase the length of said passageway.

5. The apparatus of claim 1, further including a mechanism to vibrate a portion of said passageway.

6. The apparatus of claim 1, wherein said valve reduces the cross-sectional diameter of said passageway.

7. The apparatus of claim 1, further including a hopper connected to said pump input.

* * * * *